US011293302B2

(12) United States Patent
Vinches et al.

(10) Patent No.: US 11,293,302 B2
(45) Date of Patent: Apr. 5, 2022

(54) ANTERIOR PART OF A NACELLE OF AN AIRCRAFT PROPULSION UNIT HAVING A SHOCK ABSORBING ELEMENT

(71) Applicant: AIRBUS OPERATIONS (S.A.S.), Toulouse (FR)

(72) Inventors: Frédéric Vinches, Larra (FR); Gregory Albet, Grepiac (FR); Julien Sentier, Colomiers (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 454 days.

(21) Appl. No.: 16/229,500

(22) Filed: Dec. 21, 2018

(65) Prior Publication Data

US 2019/0195085 A1 Jun. 27, 2019

(30) Foreign Application Priority Data

Dec. 21, 2017 (FR) ...................................... 1762722

(51) Int. Cl.
*F01D 21/04* (2006.01)
*B64D 29/00* (2006.01)
*B64D 33/02* (2006.01)
*F02C 7/04* (2006.01)

(52) U.S. Cl.
CPC ........... *F01D 21/045* (2013.01); *B64D 29/00* (2013.01); *B64D 33/02* (2013.01); *B64D 2033/022* (2013.01); *B64D 2033/0286* (2013.01); *F02C 7/04* (2013.01)

(58) Field of Classification Search
CPC ......... F01D 21/045; F02C 7/04; B64D 29/00; B64D 33/02; B64D 2033/0286; B64D 2033/022

USPC ............................................... 415/119, 213.1
See application file for complete search history.

(56) References Cited

U.S. PATENT DOCUMENTS

| 3,566,606 | A  | * | 3/1971 | Mortlock | ................ F02C 7/047 60/226.1 |
| 7,334,393 | B2 | * | 2/2008 | Porte | ........................ B64C 7/02 60/226.1 |
| 9,010,084 | B2 | * | 4/2015 | Chelin | ................... B64D 15/04 60/226.1 |
| 9,534,505 | B2 | * | 1/2017 | Lucas | .................... B64D 33/02 |
| 9,702,375 | B2 | * | 7/2017 | Costa | .................... F01D 25/246 |
| 9,845,707 | B2 | * | 12/2017 | Porte | ....................... B64D 33/02 |
| 9,874,228 | B2 | * | 1/2018 | Brown | ................... B64D 29/00 |

(Continued)

FOREIGN PATENT DOCUMENTS

| FR | 2 954 282 | 6/2011 |
| WO | 2010/086560 | 8/2010 |

OTHER PUBLICATIONS

French Search Report for FR1762722, dated May 16, 2018, 2 pages.

*Primary Examiner* — David E Sosnowski
*Assistant Examiner* — Hakeem M Abdellaoui
(74) *Attorney, Agent, or Firm* — Nixon & Vanderhye P.C.

(57) ABSTRACT

An anterior part of a nacelle of an aircraft propulsion unit having an air inlet lip at the front end, an internal structure and an external panel extending the air inlet lip, and an annular rigidifying frame having an external peripheral edge connected to the external panel is disclosed. The anterior part of the nacelle includes a shock-absorbing element connected rigidly on the one hand to an internal peripheral edge of the rigidifying frame and on the other hand to the internal structure.

20 Claims, 4 Drawing Sheets

(56) References Cited

U.S. PATENT DOCUMENTS

| | | | | |
|---|---|---|---|---|
| 2010/0084507 A1* | 4/2010 | Vauchel | ................. | B64D 33/02 |
| | | | | 244/1 N |
| 2013/0283821 A1* | 10/2013 | Gilson | ................. | F04D 29/545 |
| | | | | 60/805 |
| 2014/0144519 A1 | 5/2014 | Porte et al. | | |
| 2014/0147270 A1* | 5/2014 | Porte | ..................... | B64D 33/02 |
| | | | | 415/214.1 |
| 2019/0195085 A1* | 6/2019 | Vinches | ................ | F01D 21/045 |

\* cited by examiner

(Prior Art)

ANTERIOR PART OF A NACELLE OF AN AIRCRAFT PROPULSION UNIT HAVING A SHOCK ABSORBING ELEMENT

CROSS REFERENCE TO RELATED APPLICATION

This application claims priority to and incorporates by reference French Patent Application Number 1762722, filed Dec. 21, 2017.

BACKGROUND

1. Field of the Invention

The present invention relates to aircraft propulsion units and, more particularly, to the nacelles of aircraft propulsion units.

2. Description of the Related Art

A propulsion unit is a device that generates thrust propelling forward the aircraft equipped with the propulsion unit.

Figure 1:
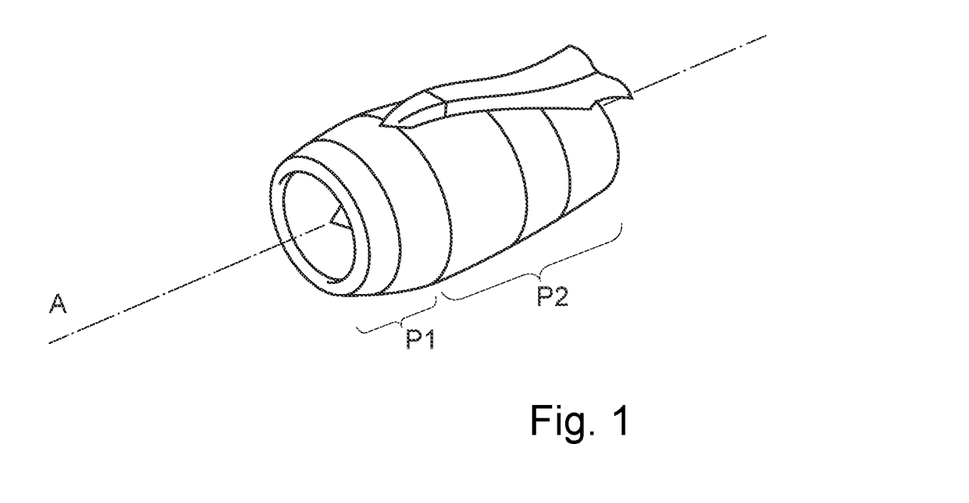
FIG. 1 is a schematic three-dimensional view of an aircraft propulsion unit.

An aircraft propulsion unit is depicted by way of example in FIG. 1.

The nacelle conventionally comprises an anterior part P1 forming an air inlet, and a main part P2.

The anterior part P1 has the role of collecting air so as to ensure even flow towards the fan.

The propulsion unit extends along a longitudinal axis "A", and is symmetrically configured around the axis.

A conventional structure of an anterior part of a nacelle of an aircraft propulsion unit, as known from the prior art, is described with reference to FIG. 2.

The anterior part of the nacelle comprises an air inlet lip 1, which may be annular or substantially annular, is arranged at the front end thereof.

Throughout the disclosure, the concepts of "front" and "rear" and of "anterior" and "posterior" are to be understood in the direction of the flow of air through the propulsion unit. Thus, air enters the propulsion unit from the front, which means to say via the anterior part P1 of the nacelle and reemerges (after some of the air has been used as oxidant) via the rear of the propulsion unit, which means to say via the rear end of the main part P2.

In the conventional structure of an anterior part P1 of the propulsion unit, a front frame 2 is position at the rear of the air inlet lip 1. An internal structure 3 comprising a soundproofing panel extends an interior surface 11 of the air inlet lip 1 rearwards.

An external panel 4 extends an exterior surface 12 of the air inlet lip 1 rearwards.

A rigidifying frame 5, also referred to as rear frame, is also positioned at a rear end of the anterior part P1 of the nacelle and connects the external panel 4 to the internal structure 3.

The rigidifying frame 5 thus defines the boundary between the anterior part P1 and the main part P2 of the nacelle.

Figure 2:
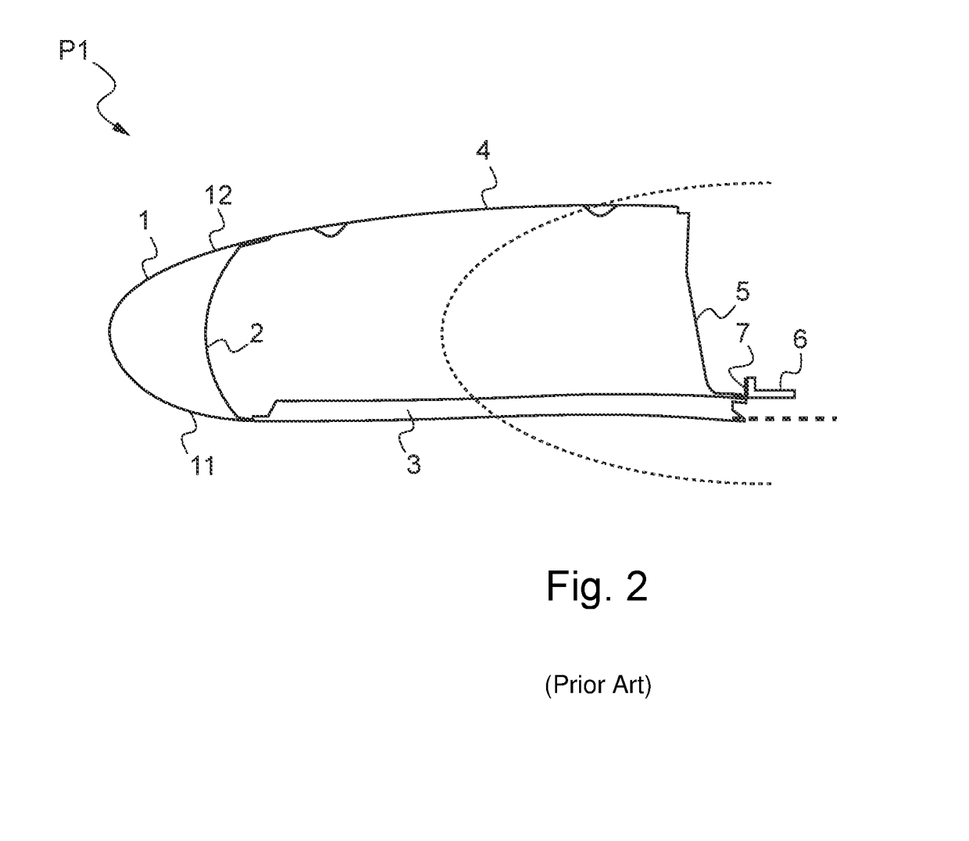
FIG. 2 is a schematic partial view in cross section of an anterior part of a nacelle of an aircraft propulsion unit according to the prior art.

An engine pad bracket 6, depicted in FIG. 2, even though it does not form part of the anterior part P1 of the nacelle, allows the rigidifying frame 5 to be connected to the engine of the propulsion unit, namely to the assembly comprising the fan and the turbomachine, and in particular allows the anterior part P1 of the nacelle to be connected to a fan compartment. The engine pad bracket 6 is in particular connected to a rear bracket 7 of the rigidifying frame 5.

In general, the front frame 2 and the rigidifying frame 5 are both positioned in a direction perpendicular to the longitudinal axis "A" of the propulsion unit. The longitudinal axis may thus coincide with an axis of revolution of the front frame or of the rigidifying frame 5.

During the various phases of the flight of an aircraft events may occur that have an impact on the propulsion unit. For example, birds or foreign objects may collide with the aircraft, and notably with one of the propulsion units thereof. These collisions may damage the propulsion units. In the most serious circumstances, a blade breakage may occur.

The structure of the nacelle, and particularly the rigidifying frame 5, must however resist such events and for example prevent the strewing of debris. Thus, the front frame 2 and the rigidifying frame 5 are engineered to absorb a great deal of energy. This has negative impacts on the weight and cost of manufacture of the frames.

FIG. 2 also depicts, in dotted line, the desired outline of an anterior part P1 of a nacelle of a propulsion unit that has a very high bypass ratio, usually referred to as "Ultra High Bypass Ratio" or "UHBR" for short.

It can be seen that the configuration of the anterior part of a nacelle used in the prior art is not perfectly suited to use for such a propulsion unit of UHBR type or, more generally, for a propulsion unit that has a nacelle of large diameter. This is because the distance between the internal structure and the external panel is increased, and requires a very tall rigidifying frame. This increased height would entail greater reinforcement. Furthermore, the engine pad bracket that is to be fixed to the rigidifying frame 5 is situated a greater distance away from the longitudinal axis "A" than the internal structure 3. In other words, the engine pad bracket 6 can no longer be connected to the rigidifying frame 5 where it connects to the internal structure 3.

SUMMARY

It is an object of the present invention to rectify at least one of the aforementioned disadvantages. For that, the invention proposes an anterior part of a nacelle of an aircraft propulsion unit having a structure optimized for large-sized nacelles.

Thus, the invention relates to an anterior part of a nacelle of an aircraft propulsion unit, the anterior part having a front end allowing air to enter and a rear end.

The anterior part comprises:

an air inlet lip arranged at the front end,
an internal structure extending an interior surface of the air inlet lip,
an external panel extending an exterior surface of the air inlet lip,
a rigidifying frame that is annular about an axis of revolution, the rigidifying frame comprising an external peripheral edge connected to the external panel.

The anterior part of the nacelle comprises a shock-absorbing element connected rigidly on the one hand to an internal peripheral edge of the rigidifying frame and on the other hand to the internal structure.

The shock-absorbing element interposed between the rigidifying frame and the internal structure of the anterior part of the nacelle solves the problem of connection between the external panel and the internal structure in the case of a nacelle of large size, and particularly of great thickness (distance between the external panel and the internal structure).

The shock-absorbing element also makes it possible to absorb deformations associated with accidental or non-accidental loadings, of the elements that make up the anterior part of the nacelle. This in particular protects the means for attaching an engine, for example using a bracket, to the anterior part.

One or several shock-absorbing elements may thus be provided, along all or part of the external peripheral edge of the rigidifying frame.

The shock-absorbing element may comprise a deformable structure formed in full or in part from a composite material or from a metal/composite hybrid material.

The anterior part of a nacelle may comprise a rear bracket configured to be connected to an aircraft engine, the rear bracket comprising a first end connected to the rigidifying frame at the internal peripheral edge thereof. The rear bracket may also be connected to the shock-absorbing element by a common join.

The rear bracket may comprise a second end having a rear flange designed to be fixed to an engine pad bracket of the aircraft engine.

The shock-absorbing element may in particular have a structure that is deformable under the effect of an impact coming from inside the anterior part, so that deformation of the deformable structure absorbs the energy of the impact in order to protect the rear bracket. The deformable structure may be deformable in such a way that deformation of the deformable structure absorbs the impact energy of a fan blade of the engine detaching from the fan at a maximum speed of the engine.

The shock-absorbing element may notably have, in cross section, two branches connected on the one hand to a vertex they have in common which is connected to the rigidifying frame and, on the other hand, to two further vertices which are connected to the internal structure. For example, the shock-absorbing element may have a triangular cross section with one vertex connected to the rigidifying frame and the other two vertices connected to the internal structure. Alternatively, each branch of the shock-absorbing element may have, in cross section, a portion in the shape of a circular arc extending between the first vertex and the internal structure. As a further alternative, each branch of the shock-absorbing element may have, in cross section, a complex shape with programmed deformation comprising a succession of concave portions and of convex portions.

At least one of the branches of the shock-absorbing element may be formed from at least two different materials, for example metal and organic matrix composite.

The shock-absorbing element may be connected to the rigidifying frame by a first extension surface configured to bear against the rigidifying frame, and the shock-absorbing element may be connected to the internal structure by a second and a third extension surface respectively configured to bear against the internal structure.

The invention also relates to an aircraft propulsion unit comprising a nacelle, the nacelle comprising an anterior part according to the invention. In particular, the propulsion unit may comprise an engine that has a bypass ratio higher than fifteen.

BRIEF DESCRIPTION OF THE DRAWINGS

Further specific features and advantages of the invention will become further apparent from the following description.

In the attached drawings, given by way of non-limiting examples.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

FIGS. 1 and 2, which respectively show general features of aircraft propulsion units and a nacelle anterior part configuration according to the prior art, were described hereinabove.

Figure 3:
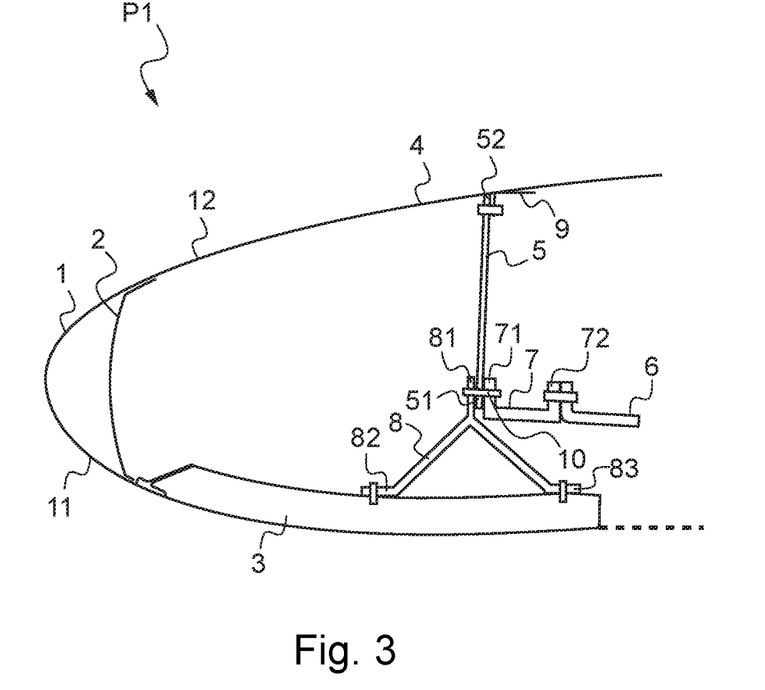
FIG. 3 is a cross-sectional view of an anterior part of a nacelle of an aircraft propulsion unit according to an exemplary embodiment.

Referring to FIG. 3, the anterior part of a nacelle of an aircraft propulsion unit according to an exemplary embodiment is illustrated. FIG. 3 is a view in cross section which is partial, inasmuch as the anterior part is a structure substantially exhibiting symmetry of revolution about the longitudinal axis "A" of the propulsion unit it is intended to equip. FIG. 3 depicts only a cross section of this substantially axisymmetric structure.

The configuration shown corresponds in particular to an anterior part of a nacelle for a UHBR engine. A UHBR engine has a bypass ratio (the mass ratio between the secondary flow and the primary flow) greater than or equal to fifteen. Such an engine has a large nacelle with a large diameter, and a thick aerodynamic profile between its external surface and its internal surface.

The anterior part P1 of a nacelle of an aircraft propulsion unit as depicted in FIG. 3 comprises an air inlet lip 1. Although depicted schematically by a simple line in FIG. 3, the air inlet lip 1 is a physical component which defines the leading edge of the anterior part of the nacelle, and therefore the leading edge of the aerodynamic fairing formed by the nacelle, once this has been put together with the anterior part.

The air inlet lip 1 forms the front end of the anterior part of the nacelle. It has a closed, substantially annular, shape, but is not necessarily perfectly circular (axisymmetric). The air inlet lip 1 has an internal surface 11 which is extended by an internal structure 3. The internal structure 3 in particular comprises a panel which forms the internal aerodynamic surface of the anterior part of the nacelle, ducting the flow of air that enters the nacelle. The internal structure 3 plays an important acoustic role limiting the noise emitted by the propulsion unit. The internal structure 3 may comprise a soundproofing panel, known from the prior art, having a configuration that makes it possible to avoid the transmission of sound waves, or encourage the absorption thereof.

The exterior surface 12 of the air inlet lip 1 is extended by an external panel 4. The external panel 4 forms the exterior aerodynamic surface of the anterior part of the nacelle. When the nacelle is put together, the external panel 4 is itself extended at the main part P2 in order to form the external aerodynamic surface of the nacelle, which is notably configured to limit the aerodynamic drag.

FIG. 3 illustrates an anterior part of a nacelle of an aircraft propulsion unit according to one embodiment of the invention. The anterior part depicted corresponds to an anterior part of a large-sized nacelle, for example of a propulsion unit of UHBR type. The anterior part comprises a rigidifying frame 5. The rigidifying frame constitutes an important structural element of the anterior part of the nacelle. The rigidifying frame 5 performs numerous functions connected with the mechanical strength of the anterior part of the nacelle. In particular, the rigidifying frame 5 is intended to be connected to the engine of the propulsion unit. What is meant by engine is, in general terms, the propulsion means which are enclosed inside the nacelle once the latter has been made up. The engine generally comprises a turbomachine and a fan driven by the turbomachine. The rigidifying frame 5 may in particular be connected to a fan compartment, namely to a casing of the fan, or to another element of the engine.

The rigidifying frame 5 has a function of connecting together the walls of the anterior part of the nacelle, namely of connecting together the external panel 4 and the internal structure 3. The rigidifying frame 5 is connected to the external annular wall 4 either directly or via an interface ring 9 which is itself fixed on the one hand to an external peripheral edge 52 of the connecting frame and on the other hand to the external panel 4. These attachments and fixed configurations may be achieved by riveting. The interface ring 9 may have a bracket-shaped cross section, with an angle suited to being in surface contact with the frame 5, along the external peripheral edge 52, and with the external panel 4.

In the case of a large-sized nacelle as depicted in FIG. 3, the distance between the external panel 4 and the internal structure 3 is great, which means that the level at which the connection to the engine is to be made is not that of the internal aerodynamic surface of the nacelle, defined by the internal structure 3. In order to maintain a connection to the engine at the bottom part of the rigidifying frame 5, the latter is supplemented in its function of connecting together the external panel 4 and the internal structure 3 by a shock-absorbing element 8 interposed between an internal peripheral edge 51 of the rigidifying frame 5 and the internal structure 3.

The shock-absorbing element 8 is fixed, for example riveted, on the one hand to the internal peripheral edge 51, and on the other hand to the rigidifying frame at its internal peripheral edge. Since all of these elements are substantially axisymmetric, the connection may be achieved by series of rivets distributed along the surfaces that are to be joined together.

The connection between the anterior part of the nacelle and the engine is achieved by two brackets connected to one another. A rear bracket 7 provides the connection between the rigidifying frame 5 and an engine pad bracket 6 (which does not form part of the anterior part of the nacelle) which may, for example, be a bracket of the fan compartment.

The rear bracket 7 thus, in the example depicted, has a front flange 71 for fixing to the rigidifying frame 5. The rear bracket 7 has a rear flange 72 providing connection to the engine pad bracket 6, which comes to bear on the rear flange 72. The aforementioned connections may be achieved using rivets.

In particular, a common join 10 between the rigidifying frame 5, the rear bracket 7 and the shock-absorbing element 8 may be achieved, for example using a set of rivets passing through each of these three components. Other connecting means are contemplated to be within the scope of the disclosure.

The shock-absorbing element 8, in addition to geometrically complementing the connection between the external panel 4 and the internal structure 3 (afforded in part by the connecting frame 5), is said to be "shock absorbing" in that it is able to absorb deformations that the anterior part of the nacelle may experience, and is able to have a geometry corresponding to the aerodynamic profile defined by the internal structure 3 and, moreover, by the external panel 4.

The shock-absorbing element 8 has a role of protecting the rest of the structure, in that it can deform in order to absorb the energy of an impact experienced by the anterior part of the nacelle. In particular, the shock-absorbing element 8 has a deformable structure allowing energy to be absorbed by deformation. The deformable nature of the structure of the shock-absorbing element is connected to its geometry and/or to the materials of which it is made. Some of the energy absorption may be achieved at the connection between the shock-absorbing element 8 and the internal structure 3.

The shock-absorbing element 8 is preferably made from one or more materials allowing the energy of an impact to be absorbed. The shock-absorbing element may be made of metal; it may in particular be made fully or partially from a metal or metal alloy exhibiting high mechanical properties (strength, elastic modulus). The shock-absorbing element may be produced in full or in part from a composite material. The composite materials envisaged notably include carbon-fibre-reinforced and/or aramid-fibre-reinforced organic matrix composites. The shock-absorbing element may be produced in full or in part from a metal/composite hybrid material.

The impact experienced may be an impact with a foreign object (e.g. bird, debris), or may be the breakage of a fan blade (which incident is often denoted by the abbreviation FBO which stands for "Fan Blade Off"), for example caused by an impact with a foreign object. The shock-absorbing element 8 particularly protects the integrity of the connection with the engine by protecting the rear bracket 7 and the engine pad bracket 6.

The shock-absorbing element 8 may have a configuration optimized for these geometric adaptation and protection functions. In particular, the shock-absorbing element 8 may have a triangular cross section. In that case, one vertex of the triangle is connected to the rigidifying frame 5 and the other two vertices are connected to the internal structure 3.

The two sides of the triangle formed by the cross section of the shock-absorbing element respectively connecting the vertex connected to the rigidifying frame 5 and the internal structure 3 may be made from the same material or from different materials. Likewise, the material that forms the sides of the shock-absorbing element 8 may change along its periphery.

In particular, the cross section may form an isosceles triangle the main vertex of which is connected to the rigidifying frame 5 and the two further vertices of which are connected to the internal structure 3.

The connection may be achieved using extension surfaces of the shock-absorbing element 8, namely a first extension surface 81 oriented in such a way as to bear against the rigidifying frame 5, a second extension surface 82 and a third extension surface 83 bearing against the internal structure 3. The extension surfaces are connected, for example by riveting, to the elements on which they respectively bear.

In the embodiment depicted, but also in all the embodiments of the invention, the connection between the shock-absorbing element 8 and the internal structure 3 may be achieved at the periphery of the shock-absorbing element 8, or on just part of the circumference thereof. In particular, the shock-absorbing element may be perforated in certain so-called non-working zones where it is not in contact with the internal structure 3. In certain embodiments, the shock-absorbing element 8 may be connected to the internal structure 3 by discrete point connections distant from one another.

In the embodiment illustrated, in certain parts of its circumference, just one of the sides of the triangle formed by the cross section of the shock-absorbing element 8 may extend as far as the internal structure 3.

Figure 4:
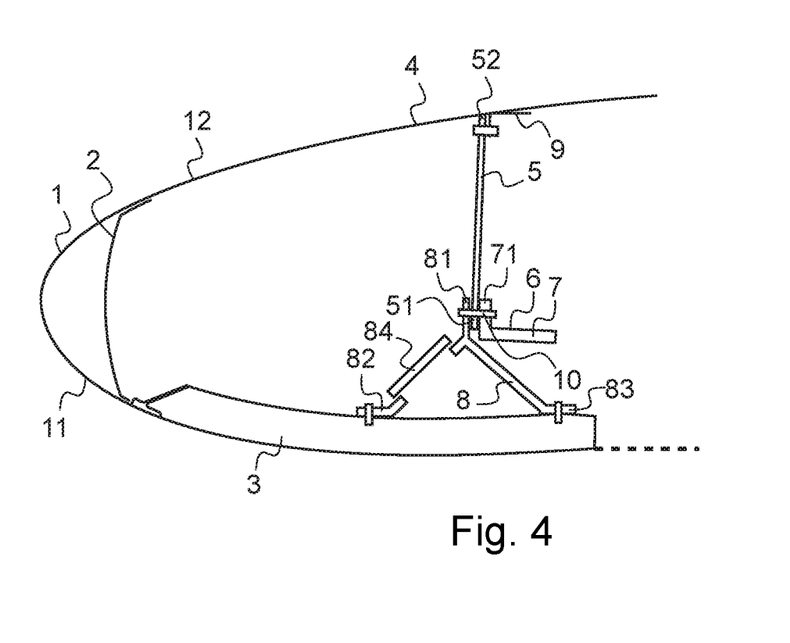
FIG. 4 is a cross-sectional view of an anterior part of a nacelle of an aircraft propulsion unit according to an exemplary embodiment.
Figure 5:
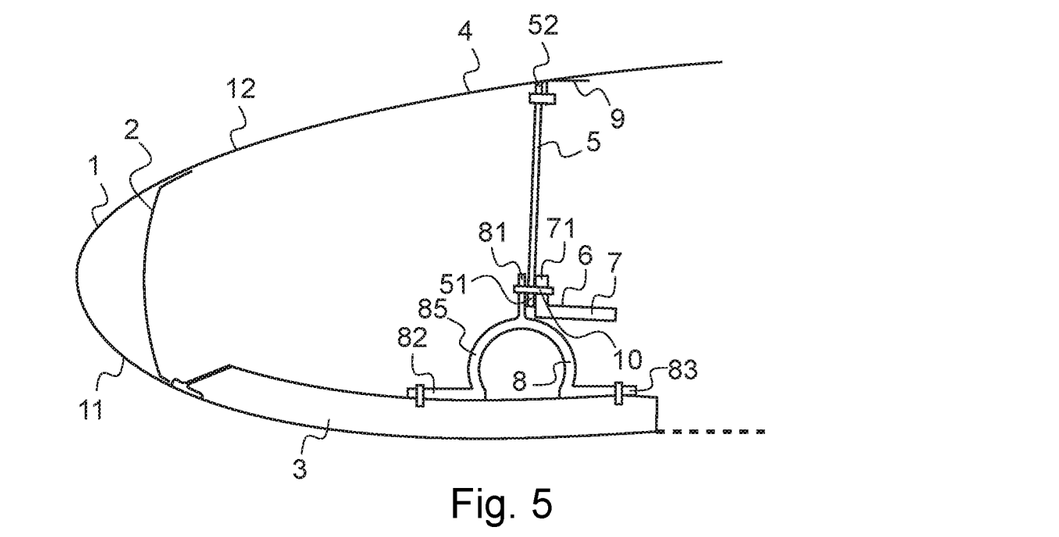
FIG. 5 is a cross-sectional view of an anterior part of a nacelle of an aircraft propulsion unit according to an exemplary embodiment.
Figure 6:
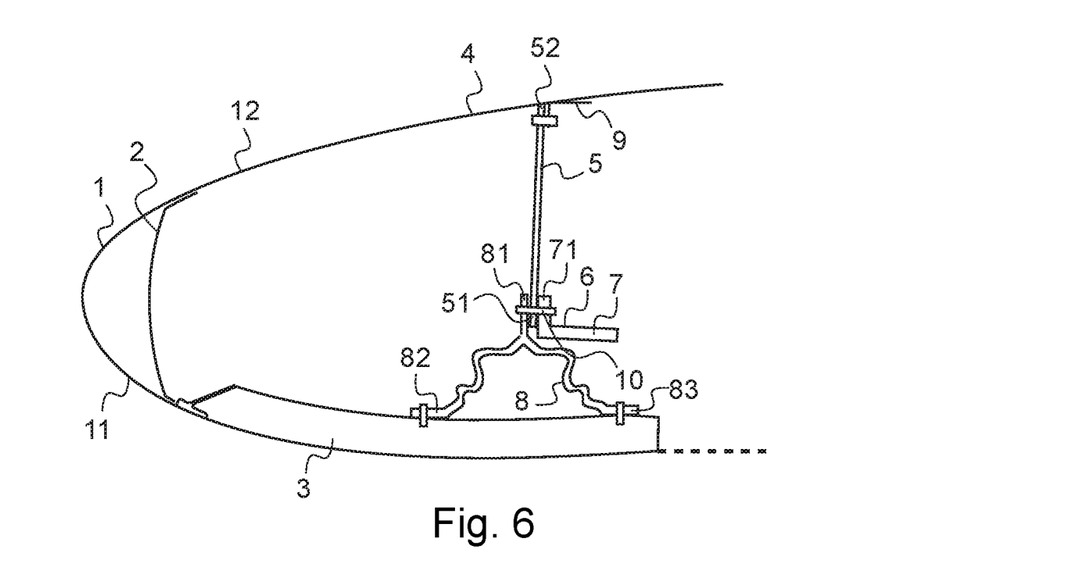
FIG. 6 is a cross-sectional view of an anterior part of a nacelle of an aircraft propulsion unit according to an exemplary embodiment; and, FIG. 7 is a schematic three-dimensional view of a connection that can be employed in an anterior part of a nacelle of an aircraft propulsion unit according to an exemplary embodiment.

Referring now to FIGS. 4 to 6, other exemplary embodiments of the shock absorbing element 8 are illustrated. The entire detailed description of the embodiment of FIG. 3 therefore applies to these alternative embodiments, with the exception of the differences detailed hereinafter.

Just like the embodiment depicted in FIG. 3, the embodiments of FIGS. 4 to 6 envision a shock-absorbing element 8 which in cross section has two branches connected to a common vertex which is connected to the rigidifying frame 5, and two opposing vertices connected to the internal structure.

The embodiment depicted in FIG. 4 differs from that of FIG. 3 in which one branch of the shock-absorbing element is formed of two materials. In the example depicted here, the front branch of the shock-absorbing element 8 comprises a section 84 made of composite materials. The section 84 may in particular be formed of an organic matrix composite material. Such a heterogeneous construction may notably offer the shock-absorbing element greater elasticity and a better capacity to absorb energy.

The embodiment of FIG. 5 shows an alternative form of shock-absorbing element 8. In this configuration, each branch of the shock-absorbing element 8 has, in cross section, a portion 85 in the shape of a circular arc extending between the first vertex of the shock-absorbing element (connected to the rigidifying frame 5) and the internal structure 3. The shock-absorbing element thus forms an arch over the internal structure 3. This geometry encourages absorption and distribution of force in the shock-absorbing element 8.

The embodiment of FIG. 6 shows another alternative form of shock-absorbing element 8. In this embodiment, each branch of the shock-absorbing element has, in cross section, a complex shape. This shape allows the branch to deform in a controlled and expected manner, under the effect of mechanical stresses. This is referred to as programmed deformation. The shape of the branch is tailored to the desired shock-absorbing characteristics. In the example depicted here, each branch comprises a succession of concave portions and of convex portions defining its shape.

In all the embodiments, the shock-absorbing element 8 is rigidly connected to the rigidifying frame 5 and also to the internal structure 3. In the disclosed embodiment, the engine pad bracket 6 and the rear bracket 7 are coincident or, in other words, the engine pad bracket 6 is directly connected to the rigidifying frame 5. As described previously, it is possible in the invention to employ a common join or connection between the shock-absorbing element 8, the rigidifying frame 5 and the rear bracket 7 (or engine pad bracket 6 when these coincide). While such a common connection simplifies the overall configuration of the nacelle, it requires that when the anterior part P1 is being separated from the rest of the nacelle, the rigidifying frame is disconnected from the shock-absorbing element.

Figure 7:
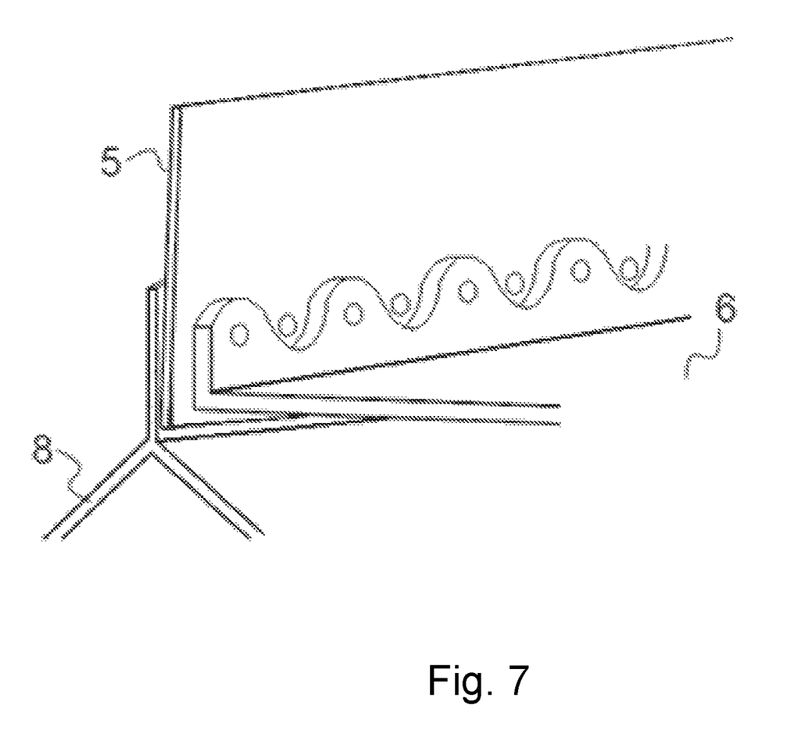

Referring to FIG. 7, common connections between the shock-absorbing element 8, the rigidifying frame 5 and the rear bracket 7 alternate with the connections between the shock-absorber 8 and the rigidifying frame 5 only. In the example depicted, one connection in two is common, and one connection in two connects the shock-absorber 8 to the rigidifying frame 5 only. For that, the surface of the engine pad bracket 6 in contact with the rigidifying frame has an undulating, for example sinusoidal, free edge.

Thus, disconnection of the common connections allows the anterior part P1 to be separated from the rest of the nacelle without detaching the shock-absorbing element 8 from the rigidifying frame 5.

Other patterns of alternating connections are conceivable, for example having two common connections to every one connection between the shock-absorber 8 and only the rigidifying frame 5.

The common connections may in particular employ cap nuts so that the anterior part P1 can be removed without the need to access both sides, front and rear, of the rigidifying frame with a tool.

The invention thus proposes a structure of an anterior part of a nacelle of an aircraft propulsion unit that is optimized for large-sized, particularly large-diameter, nacelles. This is particularly the case of nacelles for engines with ultrahigh bypass ratios, for which the connection between the anterior part of the nacelle and the engine cannot be made at the interior aerodynamic surface of the nacelle.

In such nacelles, the front frame may have a lesser structural function and have a simplified or lightened structure. In certain configurations, the anterior part of the nacelle may have no front frame. The ancillary functions such a deicing can be performed using electric means.

Moreover, the invention makes it possible, through use of a shock-absorbing element interposed between the rigidifying frame and the internal structure of the anterior part of the nacelle, to afford better protection of the connection between the anterior part of the nacelle and the engine with which the nacelle is equipped. For example, this connection, which may employ a rear bracket for connection to the rigidifying frame, enjoys increased protection (by comparison with a structure having no shock-absorbing element) against foreign object impacts or breakages of the fan blades of the engine.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anterior part of a nacelle of an aircraft propulsion unit, the anterior part having a front end allowing air to enter and a rear end, comprising:
    an air inlet lip arranged at the front end,
    an internal structure extending an interior surface of the air inlet lip,
    an external panel extending an exterior surface of the air inlet lip,
    a rigidifying frame that is annular about an axis of revolution, the rigidifying frame comprising an external peripheral edge connected to the external panel,
    wherein the level at which the connection to the engine of the propulsion unit is made not being defined by the internal structure, the bottom part of the anterior part of the nacelle comprises a shock-absorbing element interposed between an internal peripheral edge of the rigidifying frame and the internal structure, connected rigidly to an internal peripheral edge of the rigidifying frame at a first point and to the internal structure at a second point, the internal peripheral edge of the rigidifying frame being connected to the engine.

2. The anterior part of a nacelle according to claim 1, wherein the shock-absorbing element further comprises a deformable structure formed in full or in part from a composite material or from a metal/composite hybrid material.

3. The anterior of a nacelle according to claim 1, further comprising a rear bracket having a first end connected to the rigidifying frame at the internal peripheral edge thereof.

4. The anterior part of a nacelle according to claim 3, wherein the first end of the rear bracket is also connected to the shock-absorbing element by a common join.

5. The anterior part of a nacelle according to claim 4, wherein the rear bracket further comprises a second end having a rear flange designed to be fixed to an engine pad bracket of the aircraft engine.

6. The anterior part of a nacelle according to claim 5, wherein the shock-absorbing element has a structure that is deformable under the effect of an impact coming from inside the anterior part, so that deformation of the deformable structure absorbs the energy of the impact in order to protect the rear bracket.

7. The anterior part of a nacelle according to claim 6, wherein the deformable structure is deformable in such a way that deformation of the deformable structure absorbs the impact energy of a fan blade of the engine detaching from the fan at a maximum speed of the engine.

8. The anterior part of a nacelle according to claim 1, wherein the shock-absorbing element has, in cross section, two branches connected to a common vertex connected to the rigidifying frame at one end and, connect to two vertices connected to the internal structure at a second end.

9. The anterior part of a nacelle according to claim 8, wherein the shock-absorbing element has a triangular cross section with one vertex connected to the rigidifying frame and the other two vertices connected to the internal structure.

10. The anterior part of a nacelle according to claim 8, wherein each branch of the shock-absorbing element has, in cross section, a portion in the shape of a circular arc extending between the first vertex and the internal structure.

11. The anterior part of a nacelle according to claim 8, wherein each branch of the shock-absorbing element has, in cross section, a complex shape with programmed deformation comprising a succession of concave portions and of convex portions.

12. The anterior part of a nacelle according to claim 8, wherein at least one of the branches is formed from at least two different materials.

13. The anterior part of a nacelle according to claim 8, wherein the shock-absorbing element is connected to the rigidifying frame by a first extension surface configured to bear against the rigidifying frame, and the shock-absorbing element is connected to the internal structure by a second and a third extension surface respectively configured to bear against the internal structure.

14. An aircraft propulsion unit comprising a nacelle having an anterior part (P1) according to claim 1.

15. An anterior part of a nacelle of an aircraft propulsion unit, the anterior part having a front end allowing air to enter and a rear end, comprising:
    an air inlet lip arranged at the front end,
    an internal structure extending an interior surface of the air inlet lip,
    an external panel extending an exterior surface of the air inlet lip,
    a rigidifying frame that is annular about an axis of revolution, the rigidifying frame comprising an external peripheral edge connected to the external panel,
    wherein the level at which the connection to the engine of the propulsion unit is spaced apart from the internal structure, the bottom part of the anterior part of the nacelle comprises a shock-absorbing element interposed between an internal peripheral edge of the rigidifying frame and the internal structure, connected rigidly to an internal peripheral edge of the rigidifying frame at a first point and to the internal structure at a second point, the internal peripheral edge of the rigidifying frame being connected to the engine.

16. The anterior part of a nacelle according to claim 15, wherein the shock-absorbing element further comprises a deformable structure formed in full or in part from a composite material or from a metal/composite hybrid material.

17. The anterior of a nacelle according to claim 15, further comprising a rear bracket having a first end connected to the rigidifying frame at the internal peripheral edge thereof.

18. The anterior part of a nacelle according to claim 17, wherein the first end of the rear bracket is also connected to the shock-absorbing element by a common join.

19. The anterior part of a nacelle according to claim 18, wherein the rear bracket further comprises a second end having a rear flange designed to be fixed to an engine pad bracket of the aircraft engine.

20. The anterior part of a nacelle according to claim 19, wherein the shock-absorbing element has a structure that is deformable under the effect of an impact coming from inside the anterior part, so that deformation of the deformable structure absorbs the energy of the impact in order to protect the rear bracket.

\* \* \* \* \*